United States Patent
Fink et al.

(10) Patent No.: US 8,326,895 B2
(45) Date of Patent: *Dec. 4, 2012

(54) DETECTING PROGRAM PHASES WITH PERIODIC CALL-STACK SAMPLING DURING GARBAGE COLLECTION

(75) Inventors: Stephen J Fink, Yorktown Heights, NY (US); David P. Grove, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/785,436

(22) Filed: May 22, 2010

(65) Prior Publication Data

US 2010/0229156 A1   Sep. 9, 2010

Related U.S. Application Data

(63) Continuation of application No. 12/104,987, filed on Apr. 17, 2008, now Pat. No. 7,730,457, which is a continuation of application No. 10/666,102, filed on Sep. 18, 2003, now Pat. No. 7,412,694.

(51) Int. Cl.
*G06F 17/30* (2006.01)

(52) U.S. Cl. ......... 707/813; 711/127; 711/132; 711/138

(58) Field of Classification Search .......... 707/813–814; 711/127, 138, 170
See application file for complete search history.

(56) References Cited

U.S. PATENT DOCUMENTS

| | | | |
|---|---|---|---|
| 6,473,773 B1 * | 10/2002 | Cheng et al. | 707/814 |
| 6,557,091 B2 * | 4/2003 | Houldsworth | 711/170 |
| 7,003,770 B1 * | 2/2006 | Pang et al. | 718/100 |
| 7,155,728 B1 * | 12/2006 | Prabhu et al. | 719/316 |
| 2001/0037336 A1 * | 11/2001 | Sauntry et al. | 707/10 |
| 2001/0052053 A1 * | 12/2001 | Nemirovsky et al. | 711/138 |
| 2003/0093778 A1 * | 5/2003 | Bak et al. | 717/140 |

* cited by examiner

*Primary Examiner* — Hanh Thai
(74) *Attorney, Agent, or Firm* — Michael J. Buchenhorner; Vazken Alexanian

(57) ABSTRACT

A computer readable storage medium for associating a phase with an activation of a computer program that supports garbage collection include: a plurality of stacks, each stack including at least one stack frame that includes an activation count; and a processor with logic for performing steps of: zeroing the activation count whenever the program creates a new stack frame and after garbage collection is performed; determining whether an interval has transpired during program execution; examining each stack frame's content and incrementing the activation count for each frame of the stacks once the interval has transpired; detecting the phase whose activation count is non-zero and associating the phase with the activation; and ensuring that when the phase ends, an action is immediately performed.

5 Claims, 3 Drawing Sheets

DETECTING PROGRAM PHASES WITH PERIODIC CALL-STACK SAMPLING DURING GARBAGE COLLECTION

CROSS-REFERENCE TO RELATED APPLICATIONS

This application is a continuation of, and claims priority from, commonly-owned, co-pending U.S. patent application Ser. No. 12/104,987, filed on Apr. 17, 2008, which is a continuation of U.S. patent application Ser. No. 10/666,102, filed Sep. 18, 2003, issued as U.S. Pat. No. 7,412,694.

STATEMENT REGARDING FEDERALLY SPONSORED-RESEARCH OR DEVELOPMENT

The invention described herein was funded in part by a grant from the United States Government under Contract Number NBCH020056. The United States Government may have certain rights under the invention.

INCORPORATION BY REFERENCE OF MATERIAL SUBMITTED ON A COMPACT DISC

None.

FIELD OF THE INVENTION

The invention disclosed broadly relates to the field of computer program execution systems, and more particularly relates to the field of programming language implementation.

BACKGROUND OF THE INVENTION

Many computer programs execute a sequence of phases during execution; during each phase, the program executes some well-defined task. Indeed, since the inception of computer programming, programs have been described in terms of flow charts, which show graphical representations of various program phases and transitions among them. A phase is a method or function performed by a computer program. A phase begins when the program calls a method or process and completes when the result of the method is obtained.

Some previous work has suggested methods wherein if a program execution engine could detect phase shifts, it would exploit the information to improve system performance. Relevant related work is discussed in "Design and Implementation of the Opportunistic Garbage Collector," by Wilson and Moher, in Proceedings of the ACM Conference on Object-Oriented Programming Languages, Systems and Applications, 1989, which describes a system that triggers garbage collection based on a heuristic process that correlates program phases with stack height.

Several works describe methods whereby an online adaptive optimization system could reset profit data based on automatic phase shift detection. See "Online Feedback-Directed Optimization of Java," Arnold, Hind and Ryder, in Proceedings of the ACM Conference on Object-Oriented Programming Languages, Systems, and Applications, 2002; "Dynamic Hot Data Stream Prefetching for General-Purpose Programs," Chilimbi and Hirzel, in SIGPLAN 2002 Conference on Programming Language Design and Implementation, 2002; "Computing the Similarity of Profiling Data; Heuristics for Guiding Adaptive Compilation," by Kistler and Franz, in Workshop on Profile and Feedback-Directed Compilation, 1998.

Some of the known art in phase detection techniques for running computer programs looks for patterns in a stream of sequential data, reminiscent to algorithms commonly used in signal processing applications. These techniques require much tuning for sensitivity in edge detection, and rely on numerous heuristic filters to clean up noisy data.

Instead, it would be highly desirable to provide a method that exploits information that can be gathered by the program execution engine, in order to report phase boundaries definitively, without complications of sensitivity tuning and filter heuristics.

The previous work, by Wilson and Moher (referenced above), uses heuristics to detect phases of computer programs that provide good opportunities for garbage collection. One method described tags user-interaction routines, and tries to schedule garbage collection during pauses between such routines. The Wilson, et al. paper also suggests taking the height of activation stacks into account. A similar idea, for scheduling garbage collection (GC) based on stack pops, was suggested in "A Real-Time Garbage Collector Based on the Lifetimes of Objects," by Lieberman and Hewitt, Communications of the ACM, 26(6), June 1983.

These references suggest using stack activation height as an indication of phase behavior. However, a modified program execution engine can further provide information regarding the lifetime of individual activations. There is thus a need for a method to exploit additional information for accurate and simple online phase detection. Further, there is a need for a method that can be implemented with low runtime overhead and can detect nested phases.

SUMMARY OF THE INVENTION

Briefly according to the invention, a system detects phases in running computer programs that support garbage collection, using a method that begins by allocating memory space for an activation counter somewhere in system memory. The allocated memory space may comprise a plurality of stacks wherein each stack comprises a plurality of frames. Next, the activation counter is zeroed wherever the program creates a new stack frame. The method then suspends running of the program at a designated time intervals to examine each stack to determine the number of frames used in the stack and storing the resulting number in the activation counter. Finally, a phase is associated with an activation whose activation count is non-zero. The system can be a programmable information processing system that comprises program instructions for performing the above method. Alternatively, a system using the invention may comprise one or more application-specific integrated circuits for performing the method.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
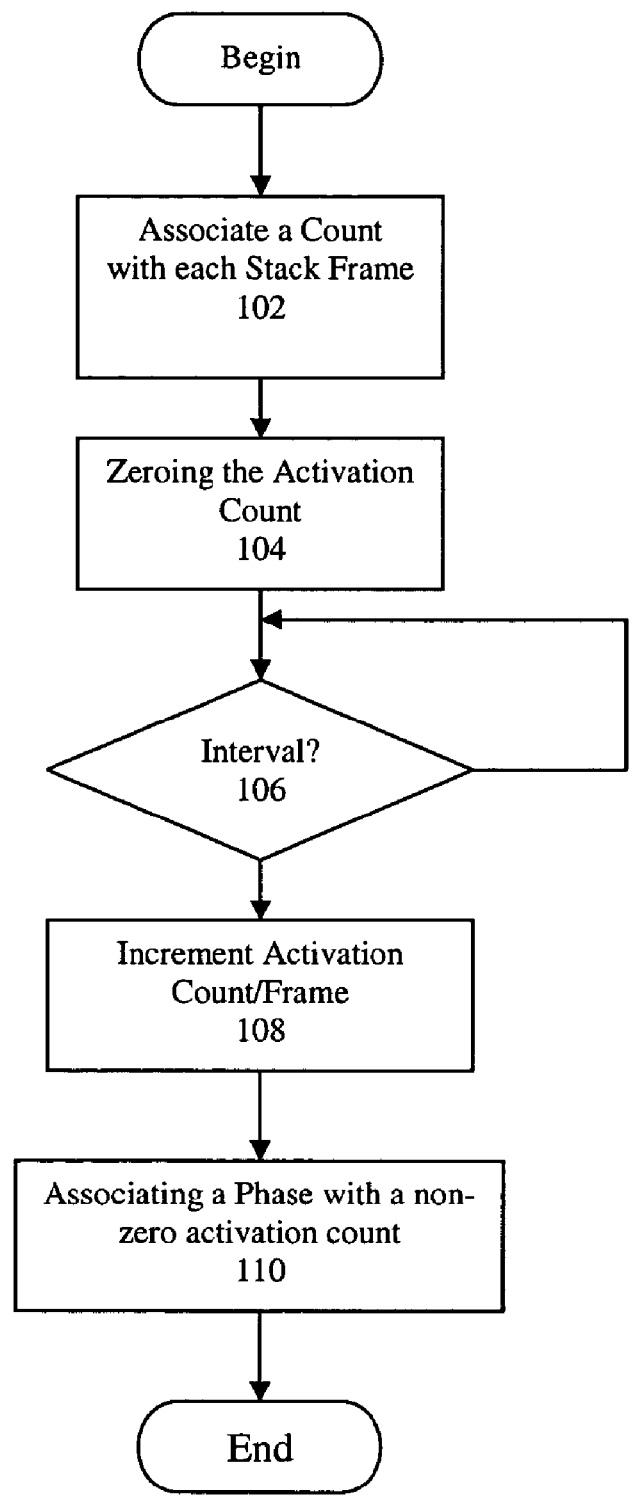
FIG. 1 is a flow chart illustrating a method according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Referring to FIG. 1, there is shown a flow chart illustrating a method 100 for detecting phases in a computer program running at least one thread according to an embodiment of the invention. The method is performed with a system that comprises a plurality of stacks each comprising at least one stack frame. Each stack frame comprises an activation counter. In step 102 an activation count is associated with each frame. Then in step 104 the activation count is zeroed whenever the system creates a new stack frame. Next in decision 106 the system determines whether an interval has transpired during program execution. This can be done using a system clock. If the interval has not transpired the process continues until the interval transpires. Once the interval has transpired, in step 108 the program walks (i.e. examines the content of) each thread's stack and increments the activation count for each frame.

At any given time, in step 110 the system associates a phase with an activation whose activation count is non-zero. The activation count is implemented by reserving storage in each stack frame. The method 100 can further include the act of logging activation counts during each interval. Further, the method 100 may include examining each stack to determine the number of frames used in the stack and incrementing the activating count for each frame in the stack.

Once a phase in a program has been detected it is advantageous to schedule performance of certain functions at the end of a phase. Among the functions that can be performed are: (1) scheduling garbage collection after each associated phase; (2) scheduling thread switches at phase boundaries; (3) scheduling checkpoint operations after each associated phase; and (4) presenting a visualization of program phase behavior; resetting profile data at program phase transitions. The method 100 can also comprise changing the return address to force the program to call a designated procedure when the frame returns.

There are various ways to implement the activation count. One possibility is to reserve a space for the activation count in the frame data structure. However, it is also possible to store the activation count in a side data structure, different from the frame structure or as an array paralleling the stack.

We now discuss an embodiment that uses the invention to implement an opportunistic garbage collection algorithm. We assume use of a standard stop-the-world garbage collector. The embodiment comprises an implementation that triggers a garbage collection when the following two conditions are met:
   a. The heap exceeds a specified occupancy level, and
   b. The program exits a relatively long-running phase.

This embodiment should result in increased garbage collection efficiency, because when a phase ends, the heap should have a favorable ratio of live-to-dead objects. We describe the embodiment in terms of a program with a single running thread. However, extensions for multiple threads are straightforward, and will be apparent to those skilled in the art.

Figure 2:
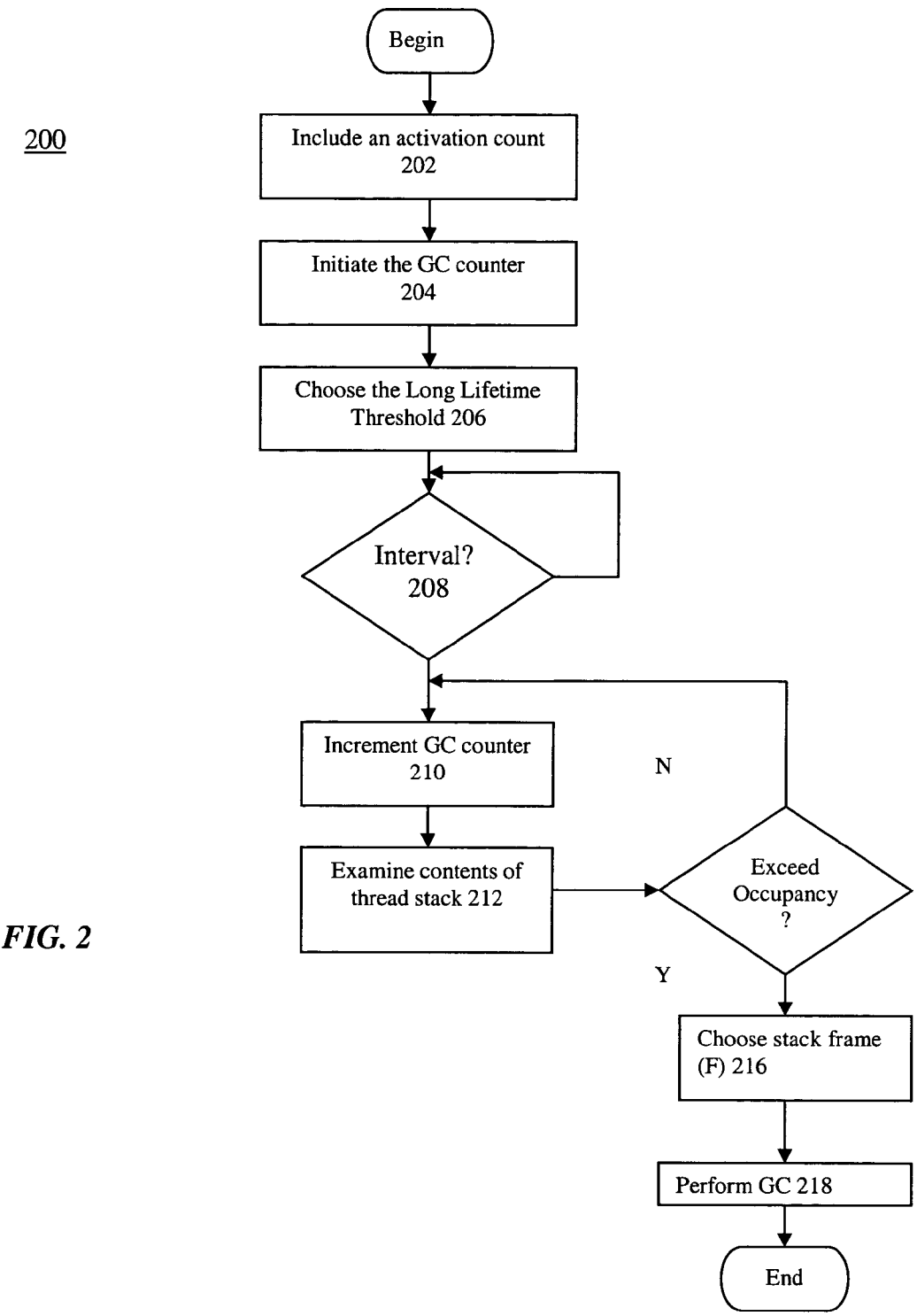
FIG. 2 is a flow chart illustrating a garbage collection method according to an embodiment of the present invention.

Referring to FIG. 2, in an embodiment a garbage collection method 200 comprises the following steps. In step 202 the system ensures that each stack frame contains a reserved word, called the activation count. In step 204, the system zeroes the activation count whenever it creates a new stack frame. The system keeps a counter, called the GC counter, which it initializes to be zero at program start-up. It resets the GC counter to zero after each garbage collection. In step 206, the system chooses a fraction between 0 and 1, called the long lifetime threshold and designates this fraction as L.

After a designated interval 208 (e.g. every 10 ms), the system suspends the running thread and performs the following steps: In step 210, it increments the GC counter. In step 212, it walks the thread's stack and increments the activation count for each frame. In decision 214, the system determines whether the heap occupancy exceeds a designated threshold (e.g. 80%), then in step 216, the system chooses the stack frame F with the smallest activation count, such that the activation count exceeds the L*GC counter. Finally, in step 218, if F exists, then set state such that when the activation F returns, the system invokes garbage collection.

Figure 3:
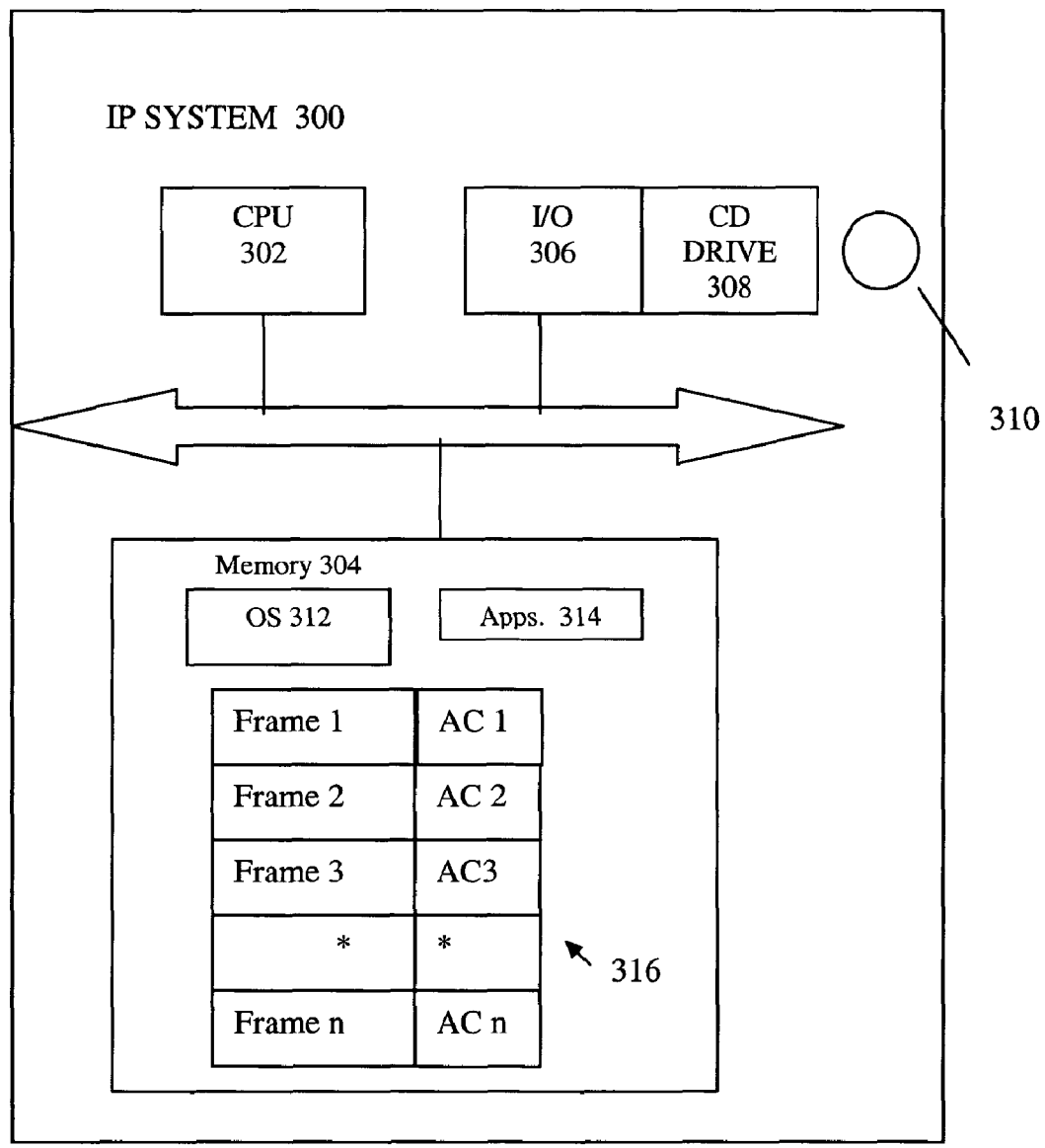
FIG. 3 is a simplified block diagram of an information processing system according to an embodiment of the present invention.

Referring to FIG. 3 there is shown a simplified block diagram of an information processing system 300 according to an embodiment of the invention. The system 300 comprises a processor (central processing unit) 302, a memory 304, and an Input/output subsystem 306. As shown, the I/O subsystem comprises a compact disk (CD) drive 308 for receiving a CD 310 comprising a computer program product comprising instructions for performing methods according to the invention. However, the I/O subsystem 306 can also be a connection to a network such as a local area network (LAN) or wide area network (WAN), and program instructions can be downloaded from another node (a server) in the network.

The memory 304 represents both volatile and non-volatile storage. It should be understood that the system 300 may cache certain items of data and instructions in various different parts of memory for performance purposes. The memory comprises a copy of an operating system 312 such as IBM's AIX™ operating system. A plurality of applications 314 is also stored in memory. The memory further comprises a stack 316 comprising a plurality of frames (1 through n) and a corresponding plurality of activation counters ($AC_1$-$CA_n$).

The invention can be implemented in various embodiments. The system 300 can be a programmable information processing system, as discussed above that comprises program instructions for performing the above-described method. Alternatively, a system using the invention may comprise one or more application-specific integrated circuits for performing the method. In most cases, the invention will be implemented as a combination of hardware and software components.

Therefore, while there has been described what is presently considered to be the preferred embodiment, it will be understood by those skilled in the art that other modifications can be made within the spirit of the invention.

We claim:

1. A computer readable storage medium having computer readable program code embodied therewith, the computer readable program code comprising instructions for:
   in a system for associating a phase with an activation of a computer program that supports garbage collection, said system comprising a plurality of stacks, each stack comprising at least one stack frame comprising an activation count, said associating comprising steps of:

zeroing an activation count whenever the computer program creates a new stack frame and after garbage collection is performed, wherein the activation count is part of a stack frame;

determining whether an interval has transpired during program execution;

continuing the computer program until the interval transpires if the interval has not transpired;

examining each stack frame's content and incrementing the activation count for each frame of the stacks once the interval has transpired;

detecting the phase whose activation count is non-zero;

associating the phase with the activation;

changing a return address of the computer program to force the computer program to call a designated procedure to perform an action; and ensuring that when the phase ends, the action is performed immediately.

2. The computer readable storage medium of claim 1 wherein the activation further comprises logging activation counts during each interval.

3. The computer readable storage medium of claim 1 wherein the activation count is implemented by reserving storage in each stack frame.

4. The computer readable storage medium of claim 1 wherein further comprising program instructions for analyzing the stack for each thread and incrementing the activation count for each frame at periodic intervals of time according to a system clock.

5. The computer readable storage medium of claim 1 further comprising program instructions for causing the system to call the designated procedure when the phase ends.

* * * * *